Jan. 22, 1957 C. H. MAY 2,778,656
INERTIA CONTROLLED FLUID PRESSURE SUSPENSION FOR VEHICLES
Filed March 17, 1951 2 Sheets-Sheet 1

INVENTOR.
Claude Hector May
BY Adams, Stevens and Mase
AGENTS.

Jan. 22, 1957 C. H. MAY 2,778,656
INERTIA CONTROLLED FLUID PRESSURE SUSPENSION FOR VEHICLES
Filed March 17, 1951 2 Sheets-Sheet 2

INVENTOR.
Claude Hector May
BY Adams, Stevens and Mase
AGENTS.

United States Patent Office 2,778,656
Patented Jan. 22, 1957

1

2,778,656

INERTIA CONTROLLED FLUID PRESSURE SUSPENSION FOR VEHICLES

Claude Hector May, Columbus, Ohio, assignor to The Murray Corporation of America, a corporation of Delaware Application March 17, 1951, Serial No. 216,182

Claims priority, application Union of South Africa March 21, 1950

10 Claims. (Cl. 280—124)

This invention relates to road vehicles and, more particularly, to suspension means for such vehicles.

This invention has as one object to provide a suspension means which will maintain the desired spring frequency and static road clearance, no matter what load is carried in the vehicle, nor no matter how such load is disposed.

Another object of this invention is the provision of such a suspension means incorporating a means to allow the vehicle to have a certain degree of automatic banking when turning a corner.

Still another object of this invention is to provide a suspension means, which includes means for maintaining the correct inflation of pneumatic tires on such a vehicle.

Still another object of this invention is to provide a suspension means, which include a means for preventing "nose-dividing" of the vehicle upon violent application of the brakes.

A further object of this invention is to provide a valve which will function to prevent fluid from escaping to a tire which has incurred a blow-out.

Additional objects and advantageous features of this invention will become apparent upon reading the following description, when read in conjunction with the accompanying drawings, wherein.

In general, the portion of this invention concerned with road vehicle suspension relates to the problem of a road vehicle of low weight, which is intended to carry a total load even exceeding the net weight. Thus, in such a vehicle if a desirable degree of comfort is to be obtained, high static deflection must be employed, by using comparatively low-rate springs. Moreover, it would be necessary for these springs to have an adjustable rate, satisfactorily to cope with the differential car loading occasioned by the seating of passengers, any one of whom may have a load weight of up to 25 percent of the curb weight of the completed vehicle. This invention accomplishes these ends by means of a novel fluid spring and control therefor, and in addition provides

2 a mechanism which will bank the car inwardly upon turning a corner, and will also prevent the car from "nose-diving" during severe braking.

In addition to the above, the suspension means constituting a portion of this device provides for regulation of the vehicle's tire pressure. Not only is the tire pressure increased when a load is placed on the vehicle, but provision is also made for increasing the tire pressure on the outside tires when the vehicle is turning a corner.

Figure 1:
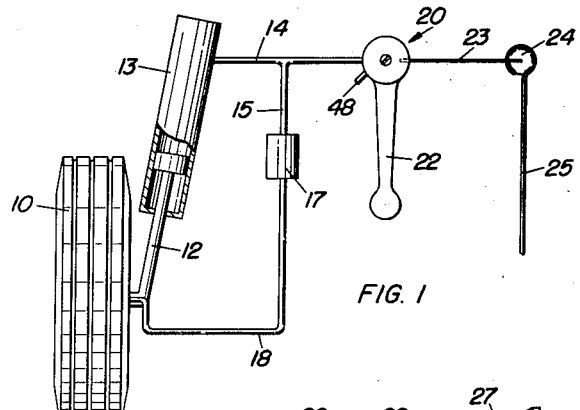
Fig. 1 is a front-elevation view, partially in section, and partially schematic, showing the vehicle suspension device as aplied to a vehicle wheel.

Considering the suspension device and valve means therefor, and referring more particularly to Fig. 1, the vehicle tire is indicated at 10. Connected to the axle of the vehicle wheel is a piston 12, which is adapted to ride in a cylinder 13. Cylinder 13 is preferably supplied with air under pressure. However, other gases may be used. For illustrative purposes, the entire device has been described in conjunction with the utilization of air as the cushioning means. The cylinder 13 is supplied with air pressure through pipe 14, which pipe has a branch 15, which leads to a pressure-reducing valve 17. Flexible pipe 18, on the low-pressure side of the pressure-reducing valve 17, is connected by suitable connections, to be hereinafter described, to the vehicle tire. Line 14 is connected to the valve, indicated generally at 20, which valve is equipped with a pendulum-type weight 22 and a resilient member 23, preferably constructed of spring steel. Resilient member 23 is connected through rubber bushing 24 to rod 25, which in turn is connected to the axle of the vehicle wheel. For purposes of simplification, the connection to the axle of the wheel has not been shown. High-pressure air is supplied to valve 20 by means of line 48, which is connected to a suitable source.

Figure 3:
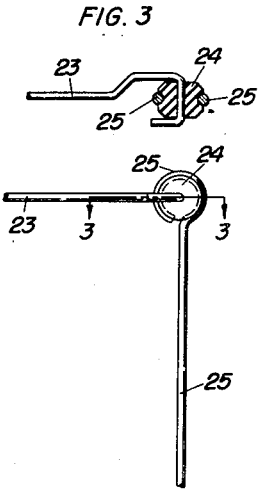
Fig. 3 is a section of Fig. 2 in the plane 3—3.
Figure 2:
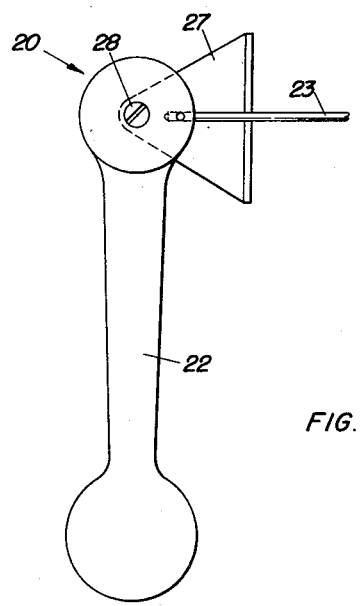
Fig. 2 is a detail of a portion of the vehicle suspension device, shown in Fig. 1.

Referring more particularly to Fig. 2, there is shown a detail of valve 20, and the connection of rod 23 to rod 25. Referring to Figs. 2 and 3, triangular-shaped member 27 is a portion of the vehicle frame to which the valve 20 is attached, screw 28 connecting valve 20 and pendulum 22 to the vehicle frame.

Referring more particularly to Figs. 4, 5, 6 and 7, there is shown a detail of the valve indicated generally at 20 in Figs. 1 and 2. Valve member 30 is circular in shape and pendulum arm 22 forms an extension thereof. Rod 23 is connected to this valve member 30 by means of a punched recess 31 which secures the resilient rod 23 in opening 32 in valve member 30. Valve seat member 34, opposite circular valve member 30, is provided with openings 36, 37 and 38 therein. Each of these openings is provided with one of seals 40—40, including O rings 41—41 and springs 42—42. Circular member 30 is provided with a kidney-shaped recess 44 therein, adapted to cooperate with openings 36, 37 and 38, and of a size to permit cooperation with any two adjacent openings. Kidney-shaped recess 44 is in the nature of a transfer port. Opening 36 exhausts to atmosphere. Opening 37 is connected to pipe 14 by means of nut 46 and sealing ring 47. Opening 38 connects to high-pressure air line 48 and a seal is effected by sealing ring 49 and nut 50. High-pressure line 48 is connected to a high-pressure source of fluid supply, such as an air cylinder. Screws 28 and nut 51 are used to connect the valve in assembled relation. Valve seat member 34 is pinned to plate 27 by means of pin 52x. It will, therefore, be seen that valve seat member 34 is held in rigid position with relation to the vehicle frame through its connection to vehicle frame member 27, valve member 30 being free to rotate, through a limited distance, in order to effect connection between openings 36 and 37, or openings 37 and 38. When openings 37 and 38 are connected together by means of transfer port 44, high pressure fluid (preferably air) will be fed into suspension cylinder 13 through line 14 and also into tire 10 through reducing valve 17 in line 18. When transfer port 44 connects opening 37 and opening 36 the air in cylinder 13 and in tire 10 will exhaust to atmosphere.

As shown in Fig. 1, the valve 20, associated linkages and pipes, suspension cylinder 13, and tire 10 have been shown in a more or less schematic arrangement in order to show the connection of the various pipes. Actually, valve 20 and links 23 and 25 would be positioned in substantially a mirror image of their position as shown in Fig. 1, in order to obtain the desirable results of this invention. The preferred arrangement of valve 20 and its associated linkages is shown in plan view in Fig. 8. Referring to that figure, there are shown two tires, 10a and 10b, and two suspension cylinders 13a and 13b. Valve 20a is provided, as is valve 20b. Linkage 23a connects pendulum portion and valve body portion 30 of valve 20a to the wheel. This connection may be either to the nonrotating portion of the wheel directly, or to piston arm 12. (See Fig. 1). Line 14a carries fluid under pressure to cylinder 13a, while line 52a corresponds to opening 52 in Fig. 5, which is the exhaust to atmosphere from opening 36. 52b performs a similar function for valve 20b, as does line 14b. Pipes 48a and 48b are connected to compressed air or other compressed fluid cylinder 54.

Figure 4:
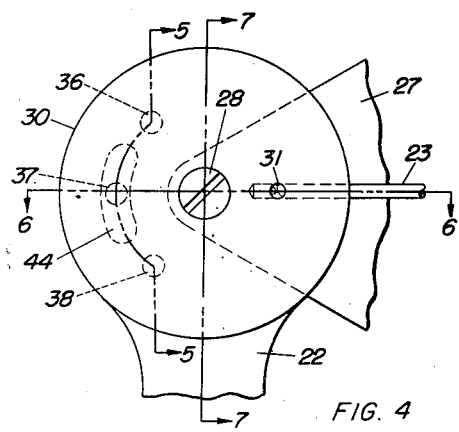
Fig. 4 is a detail of the suspension value arrangement shown in Figs. 1 and 2, Fig. 4 being a side-elevation view of such a valve.
Figure 5:
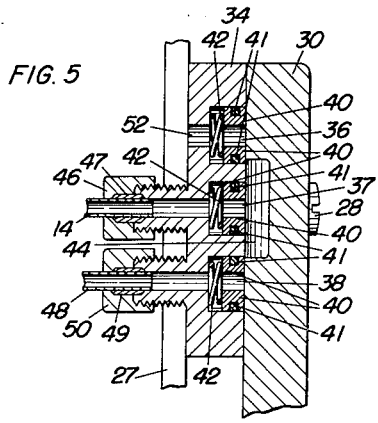
Fig. 5 is a section of Fig. 4 in the plane 5—5.
Figure 6:
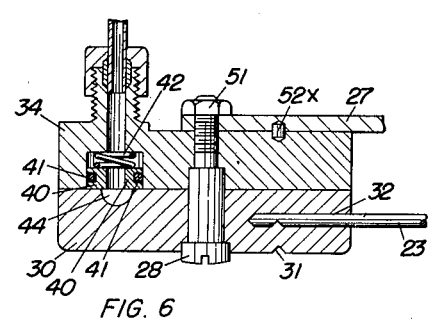
Fig. 6 is a section of Fig. 4 in the plane 6—6.
Figure 7:
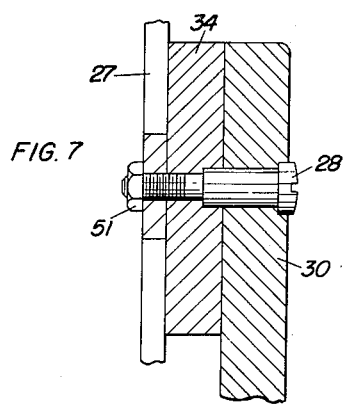
Fig. 7 is a section of Fig. 4 in the plane 7—7.

The operation of this device is as follows: With the system in equilibrium and the vehicle static, there will be no interconnection between openings 36, 37 and 38, substantially as shown in Fig. 4. If a weight is added to the vehicle, such as the weight of a person entering the vehicle, the frame will initially lower. Such lowering of the frame and frame member 27 causes a lowering of the general valve assembly 20. However, resilient member 23 has the portion connected to rubber bushing 24 held at the same point above the ground and, consequently, as the speed of movement is too slow to flex the member 23, it will act as a lever and will cause pendulum arm 22 to move to the right, (see Fig. 4) until openings 37 and 38 are connected together by means of transfer port 44. This will admit high pressure fluid into cylinder 13 until such time as the vehicle frame has risen to a point such that arm 22 has been returned to the vertical, whereby the fluid flow is cut off. Thus, it will be seen that an adjustable spring rating device has been provided, so that weights of different values may be placed in different parts of the car, and yet the car will always maintain a level horizontal position, except when turning a corner, as will be explained later.

When the vehicle is running, if a wheel should drop into a depression in the road, linkage 25 and bushing 24 would be moved downwardly therewith, but since spring arm 23 is a flexible member, the inertia of the pendulum will prevent rotation of valve member 30 and prevent interconnection of the openings and the movement of link 25 downwardly will merely cause a momentary flexing of resilient arm 23. The same is true when the wheel hits a bump. Accompanying movement of arm 25 upwardly, merely causes flexure of resilient member 23, and the inertia of pendulum member 22 prevents any air transfer.

Figure 8:
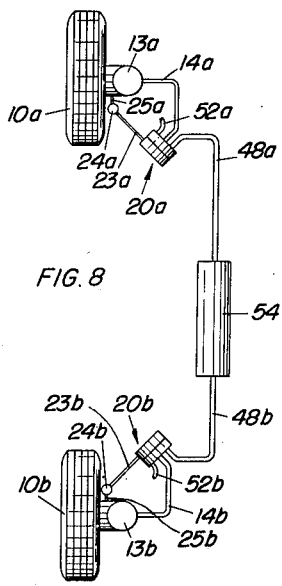
Fig. 8 is a top view of one side of a road vehicle, showing the positioning of the valves, constituting a portion of the vehicle suspension system, in relation to the vehicle frame.

Referring now more particularly to Fig. 8, let us assume that wheels 10a and 10b are the outside wheels while the vehicle is making a turn. Inertia will cause pendulum arm 22 to be thrown outwardly, and since it is positioned on an angle, it will swing toward wheel 10a, linkage 25 and bushing 24 on valve 20a. (See Fig. 1) Referring to Figs. 4, 5, and 6, it will be seen that movement of pendulum arm 22 toward its spring arm 23 will connect high-pressure air line 48 and line 14, which is the connection to the suspension cylinder 13. Thus, more air will be forced into cylinder 13 raising the car on the outward side and banking it inwardly, and extremely desirable feature.

The same thing will happen to the portion of the car suspended on cylinder 13b. The pendulum associated with valve 20b will tend to move toward the wheel, and will therefore cause the high-pressure air line and the line to cylinder 13b to be connected together, thereby raising that side of the car and, consequently, tending to bank the car inwardly while the car is turning a corner.

Let us suppose that wheels 10a and 10b are the inside wheels when rounding a corner. Pendulum arm 22, associated with valve 20a would tend to move away from tire 10a, thereby causing openings 36 and 37 to be connected by transfer port 44, and permitting some of the air in cylinder 12a to be bled off to the atmosphere. The same is true with wheel 10b. The pendulum associated therewith would tend to move away from wheel 10b thereby permitting some of the air in cylinder 13b to be released to atmosphere. This action would cause a lowering of the car on the inside of the turn.

It must be remembered that, since there is a pressure-proportioning valve 17 included in this arrangement, when wheels 10a and 10b are on the outside when the car is turning a corner, in addition to causing the vehicle frame on the outside to be raised, air flow into the suspension cylinder is accompanied by a higher air pressure in the outside tires, thereby compensating for the greater load on these tires. The reverse is true of the tires on the inside when the vehicle is turning a corner. In that case, air is removed from the suspension cylinders, and is also removed from the tires. At the entry of pipe 15 into pressure-reducing valve 17, there is a restricted passage so that the valve would not operate at the instantaneous rise in pressure in cylinder 13 when tire 10 hits a bump.

When the vehicle is braked suddenly, it will be noticed that the pendulum associated with valve 20a will tend to be moved forwardly or, in effect, toward tire 10a, assuming that tire 10a is that one at the front of the vehicle and that tire 10b is at the rear. This results in increasing the pressure in cylinder 13a or raising that portion of the car. It will be remembered that the right-hand front suspension assembly, corresponding to that shown, will react in the same manner, so that the front end of the car will tend to rise while braking. The opposite is true of the rear end. As illustrated by the suspension at wheel 10b, the pendulum here tends to move away from the wheel, and, consequently, air is removed from suspension cylinder 13b, with the result that the rear of the car tends to settle. This arrangement prevents the dangerous and undesirable effects of "nose diving" which are very common in modern cars.

It will also be seen that there has been provided, not only a suspension apparatus for a road vehicle of varying spring rate, which will satisfactorily cope with the differential vehicle loading which is the normal procedure in a modern automobile, but, further, there has been provided means for raising the outer side of the car and lowering the inner side of the car, as well as the provision for increasing the pressure in the outer tires of the car and reducing the pressure on the inner tires of the car while the car is turning a corner. This necessarily permits much more rapid and safer turning of a corner. In addition to that, there has been provided means for preventing the car from "nose diving" as a result of the sudden application of the brakes.

The maintenance of correct tire pressures which comes about from the functioning of the whole system will greatly reduce the frequency of tire failures and may eliminate the possibility of a blow-out altogether.

Figure 9:
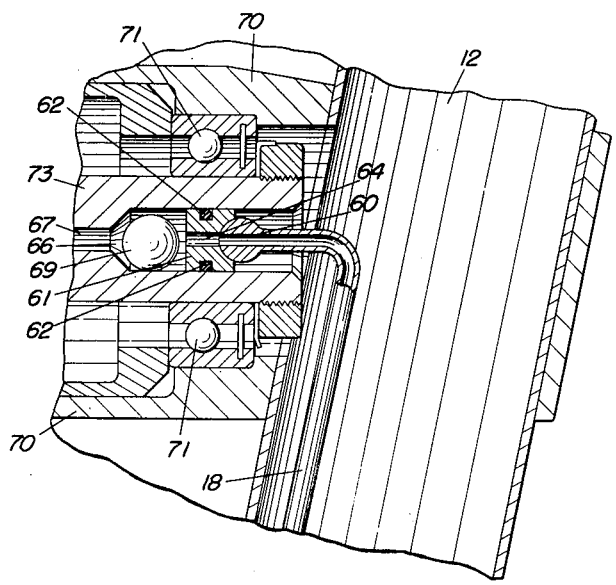
Fig. 9 is a sectional view of the tire blow-out valve constituting a portion of this invention.

Naturally, in the apparatus described, supra, a tire failure would result in bleeding air from the tire and the pneumatic or compressed fluid system of the vehicle. In the case of slow or moderate leaks, this would be of no importance as an air compressor would be an essential portion of the equipment on the vehicle. In the case of a burst tire, however, the rapid loss of air would cause consequent collapse of the entire suspension apparatus. Such an eventuality is forestalled by the apparatus shown in Fig. 9. Referring to that figure, air line 18 is shown provided with a rounded end 60 abutting seal 61 equipped with O-ring 62. Seal 61 is provided with an opening 64 therein which opens into chamber 66, which in turn through opening 67, leads to the tire. Provided within chamber 66 is a ball 69 having a diameter of approximately 80% of the diameter of the chamber. The wheel housing indicated generally at 70—70 is provided with ball bearings 71 so that wheel connecting member 73 will rotate therein.

The operation of this device is as follows: The flow of air through pipe 18, opening 64, chamber 66, and opening 67 will not disturb the position of ball 69. However, a violent outflow of air through line 18 will cause ball 69 to seat against opening 67 thereby covering that opening and preventing any further flow of air therethrough. Thus, a blowout or failure of any one tire will not cause the entire pneumatic suspension system of the vehicle to deteriorate.

While this invention has been described in its preferred embodiment, it is to be understood that the words used are words of description rather than of limitation and that changes in the purview of the appended claims may be made without departing from the true scope and spirit of the invention.

What is claimed is:

1. In a vehicle provided with a frame and wheels, a suspension device comprising: fluid suspension means connected between each wheel and said frame; and valve means associated with each said fluid suspension means for regulating the fluid pressure therein; each said valve means having a valve member pivotably connected to said frame, connected through resilient means to the axle of said wheel, and connected to a suspended weight; wherein the axis of said pivotable connection is so positioned as to permit movement of said weight in a direction having a substantial component of motion in a lengthwise direction in said vehicle, whereby the position of said weight will be responsive to acceleration and deceleration forces when present during motion of said vehicle, and having a substantial component of motion perpendicular to said lenghtwise direction, whereby the position of said weight will be responsive to centrifugal forces when present during the operation of said vehicle.

2. In a vehicle provided with a frame and wheels, a suspension device according to claim 1, wherein said suspended weight is so constructed and positioned as to remain normally in a vertical position and to be pivotable in a vertical plane inclined approximately 45 degrees from the lengthwise direction of said vehicle.

3. A suspension device for a road vehicle provided with a body and wheels, said device comprising fluid suspension means connected between the body and the wheels of the vehicle, a fluid source, a first means connected between said fluid source and said fluid suspension means for regulating the pressure of fluid in said suspension means, a suspended weight connected to said first means, and a resilient means connected to said first means and so connected to the wheels of the vehicle as to be actuated by vertical movement of said wheels, said first means being adapted to be actuated by the inertia of said suspended weight, as modified by the action of said resilient means.

4. The structure set forth in claim 3 wherein said suspended weight is a pendulum.

5. The structure set forth in claim 3 wherein said resilient means includes a rod of spring steel.

6. A suspension device for a road vehicle provided with a body and wheels having pneumatic tires thereon, said device comprising pneumatic suspension means connected between the body and the wheels of the vehicle, a source of air under pressure, a first means connected between said air source and said pneumatic suspension means for regulating the pressure of air in said suspension means, a second means for regulating the air pressure in said tires, proportionate to the pressure in said suspension means, a suspended weight connected to said first means, and a resilient means connected to said first means and so connected to the wheels of the vehicle as to be actuated by vertical movement of said wheels, said first means being adapted to be actuated by the inertia of said suspended weight, as modified by the action of said resilient means.

7. The structure set forth in claim 6 wherein said second means has a restriction therein.

8. A suspension device for a vehicle body having a frame, a pair of front wheels having tires, a pair of rear wheels having tires, one of each of said pairs being approximately aligned at each side of said body and frame, resilient means independently supporting each said wheel on said body and frame, means responsive to the acceleration of the body and frame relative to the wheel, means interconnecting said responsive means to said resilient means for modifying the resilient means when said body and frame tend to accelerate relative to said wheels for retaining said frame and body in a substantially horizontal position, means for changing the resiliency of said wheel supporting means in response to a change in the vertical position of the body and frame when maintained in said substantially horizontal position, and means for changing the pressure in the tires of the wheels corresponding to the change in resiliency of the supporting means for the associated wheel.

9. A suspension device for a vehicle body having a frame, a pair of front wheels having tires, a pair of rear wheels having tires, one of each said pair being approximately in aligned relation on opposite sides of the body and frame, a fluid actuated piston and cylinder for independently supporting each said wheel from said body and frame, a source of fluid pressure, valve means connecting said fluid pressure to said fluid actuated pistons and cylinders, pendulum means actuating said valve means so located as to operate said valve means corresponding to forces applied both laterally and longitudinally of the body and frame, said valve means having ports which connect the fluid pressure to certain of the wheel supporting pistons and cylinders at the same time that fluid is bled from the wheel supporting pistons and cylinders disposed on the opposite portion of the body and frame, and means connecting the valves to the tires of the wheels for changing the pressure thereof conforming to the increased and decreased change of pressure in the cylinders and pistons supporting the wheels.

10. A suspension device for a vehicle body having a frame, a pair of front wheels, a pair of rear wheels, one of each said pair being approximately in aligned relation on opposite sides of the body and frame, a fluid actuated piston and cylinder for independently supporting each said wheel from said body and frame, a source of fluid pressure, valve means connecting said fluid pressure to said fluid actuated pistons and cylinders, pendulum means actuating said valve means so located as to operate said valve means corresponding to forces applied both laterally and longitudinally of the body and frame, said valve means having ports which connect the fluid pressure to certain of the wheel supporting pistons and cylinders at the same time that fluid is bled from the wheel supporting pistons and cylinders disposed on the opposite portion of the body and frame, and means for changing the position of said valve means in response to changes in the vertical position of the body and frame caused by changes in the loading thereof when maintained in approximately horizontal position.

References Cited in the file of this patent

UNITED STATES PATENTS 1,047,238    Kennedy _____ Dec. 17, 1912

(Other references on following page)

UNITED STATES PATENTS

| | | | |
|---|---|---|---|
| 1,058,758 | Kennedy | Apr. 15, 1913 |
| 1,374,930 | Lazarus | Apr. 19, 1921 |
| 1,578,089 | Parker | Mar. 23, 1926 |
| 1,641,640 | Myers | Sept. 6, 1927 |
| 1,652,341 | Beck | Dec. 13, 1927 |
| 1,712,562 | Jeffers | May 14, 1929 |
| 2,115,072 | Hunt | Apr. 26, 1938 |
| 2,338,897 | Boulogne | Jan. 11, 1944 |
| 2,387,249 | Eddington | Oct. 23, 1945 |
| 2,390,749 | Swift | Dec. 11, 1945 |
| 2,490,311 | Du Rostu | Dec. 6, 1949 |
| 2,548,950 | Coles | Apr. 17, 1951 |
| 2,593,040 | Lloyd | Apr. 15, 1952 |
| 2,644,699 | Weiertz et al. | July 7, 1953 |